(12) United States Patent
Ling et al.

(10) Patent No.: US 11,057,216 B2
(45) Date of Patent: Jul. 6, 2021

(54) PROTECTION METHOD AND PROTECTION SYSTEM OF SYSTEM PARTITION KEY DATA AND TERMINAL

(71) Applicant: HuiZhou TCL Mobile Communication Co., Ltd., HuiZhou (CN)

(72) Inventors: Xiaorong Ling, HuiZhou (CN); Yajiao Wei, HuiZhou (CN); Yunqing Huang, HuiZhou (CN); Jinguo Zheng, HuiZhou (CN); Zeming Huang, HuiZhou (CN); Haibo Zhong, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 163 days.

(21) Appl. No.: 16/462,551

(22) PCT Filed: Oct. 31, 2017

(86) PCT No.: PCT/CN2017/108701
§ 371 (c)(1),
(2) Date: May 21, 2019

(87) PCT Pub. No.: WO2018/090823
PCT Pub. Date: May 24, 2018

(65) Prior Publication Data
US 2019/0349202 A1 Nov. 14, 2019

(30) Foreign Application Priority Data
Nov. 21, 2016 (CN) .......................... 201611048270.5

(51) Int. Cl.
*H04L 9/32* (2006.01)
*G06F 16/901* (2019.01)
*H04L 9/30* (2006.01)

(52) U.S. Cl.
CPC ........ *H04L 9/3239* (2013.01); *G06F 16/9014* (2019.01); *H04L 9/30* (2013.01); *H04L 9/3247* (2013.01)

(58) Field of Classification Search
CPC . H04L 9/3239; H04L 9/3247; G06F 16/9014; G06F 9/406; G06F 21/575; G06F 16/2255; G06F 21/152
See application file for complete search history.

(56) References Cited

U.S. PATENT DOCUMENTS

| | | | |
|---|---|---|---|
| 6,907,522 B2 | 6/2005 | Morais et al. | |
| 7,380,140 B1 * | 5/2008 | Weissman | G06F 21/575 709/213 |

(Continued)

FOREIGN PATENT DOCUMENTS

| | | |
|---|---|---|
| CN | 1469238 | 1/2004 |
| CN | 103927490 | 7/2014 |

(Continued)

OTHER PUBLICATIONS

International Search Report and the Written Opinion dated Jan. 4, 2018 From the International Searching Authority Re. Application No. PCT/CN2017/108701 and Its Translation of Search Report Into English. (9 Pages).

*Primary Examiner* — Tongoc Tran (57) ABSTRACT

Disclosed are a protection method and a protection system of system partition key data and a terminal. The protection method includes: obtaining a verification table corresponding to key data carried in a system partition file when a bootloader is started, and decrypting a digital signature by using a preset public key or a private key to obtain a first (Continued)

verification value; generating a second verification value according to a block address and a hash value, and comparing the first verification value with the second verification value; and starting a system if the first verification value is consistent with the second verification value.

12 Claims, 2 Drawing Sheets

(56) References Cited

U.S. PATENT DOCUMENTS

| | | | |
|---|---|---|---|
| 7,676,840 B2 | 3/2010 | Morais et al. | |
| 2003/0028761 A1* | 2/2003 | Platt | G11B 27/005 |
| | | | 713/150 |
| 2003/0229777 A1 | 12/2003 | Morais et al. | |
| 2010/0062844 A1* | 3/2010 | Crowder, Jr. | G07F 17/32 |
| | | | 463/29 |
| 2013/0147913 A1* | 6/2013 | Steiner | H04N 21/4882 |
| | | | 348/43 |
| 2013/0173898 A1 | 7/2013 | Berg et al. | |
| 2013/0185548 A1* | 7/2013 | Djabarov | G06F 21/602 |
| | | | 713/2 |
| 2013/0227263 A1 | 8/2013 | Kim et al. | |
| 2014/0281354 A1 | 9/2014 | Tkacik et al. | |
| 2014/0325644 A1 | 10/2014 | Oberg et al. | |
| 2015/0113291 A1* | 4/2015 | Suykerbuyk | H04L 9/3247 |
| | | | 713/193 |
| 2015/0215492 A1* | 7/2015 | De Vuono | G06T 1/0042 |
| | | | 382/100 |
| 2017/0373839 A1* | 12/2017 | Suresh | G06F 21/575 |

FOREIGN PATENT DOCUMENTS

| | | |
|---|---|---|
| CN | 106778283 | 5/2017 |
| WO | WO 2018/090823 | 5/2018 |

* cited by examiner

PROTECTION METHOD AND PROTECTION SYSTEM OF SYSTEM PARTITION KEY DATA AND TERMINAL

RELATED APPLICATIONS

This application is a National Phase of PCT Patent Application No. PCT/CN2017/108701 having International filing date of Oct. 31, 2017, which claims the benefit of priority of Chinese Patent Application No. 201611048270.5, filed on Nov. 21, 2016. The contents of the above applications are all incorporated by reference as if fully set forth herein in their entirety.

FIELD AND BACKGROUND OF THE INVENTION

The present invention relates to the field of terminal equipment, and more particularly to a protection method and a protection system of system partition key data and a terminal.

In recent years, the popularity of Android smart phones has become higher and higher, and the user experience has become better and better. However, system security issues have always been the focus of users and operators. Google and various mobile phone solution providers have also made many improvements in security, for example, partition encryption, security version verification and other solutions. However, for system partition, the partition file cannot be encrypted because it is too large. At present, Google only provides the DM-verity mechanism to ensure the data security of the system partition. This mechanism is an open source project and can be closed with the adb command under certain conditions. Thus, when some data files in the system partition are cracked (such as files that record system properties), it is equivalent to the cracking of the entire system, so that the security of the system is affected.

Therefore, the prior art has yet to be improved.

SUMMARY OF THE INVENTION

The embodiment of the present invention provides a protection method and a protection system of system partition key data and a terminal, which can protect key data of a system partition without encrypting the entire system partition.

First, the embodiment of the present invention provides a terminal, including a processor and a memory, wherein the memory is configured to store instructions and data, and the processor is configured to perform following steps:

obtaining a verification table corresponding to key data carried in a system partition file when a bootloader is started, wherein the verification table includes a digital signature, a block address, and a hash value;

decrypting the digital signature by using a preset public key or a private key to obtain a first verification value;

generating a second verification value according to the block address and the hash value, and comparing the first verification value with the second verification value; wherein generating the second verification value specifically includes: placing the hash value after the block address to form a second to-be-verified value, and using an EVP series function provided in an openssl library to calculate a SHA256 hash value of address as the second verification value;

starting a system of the terminal if the first verification value is consistent with the second verification value; and determining that a file of the key data is tampered with when the first verification value is inconsistent with the second verification value, and automatically shutting down the terminal.

Furthermore, the step of starting the system if the first verification value is consistent with the second verification value includes:

calculating a current hash value of the key data according to the block address if the first verification value is consistent with the second verification value;

comparing the current hash value with the hash value, and starting the system when the current hash value is consistent with the hash value.

Furthermore, before the step of obtaining the verification table corresponding to the key data carried in the system partition file when the bootloader is started, wherein the verification table comprises the digital signature, the block address and the hash value, the processor is configured to perform steps of:

generating a mapping file that records all files of system partition and corresponding block addresses when compiling a system file;

determining the block address corresponding to the key data according to the mapping file and calculating the hash value of the block address;

generating the first verification value according to the block address and the hash value, and encrypting the first verification value by using the preset private key or the public key to obtain the digital signature;

storing the digital signature, the block address, and the hash value in the verification table, and appending the verification table to the system file.

Furthermore, the step of generating the first verification value according to the block address and the hash value, and encrypting the first verification value by using the preset private key or the public key to obtain the digital signature includes:

placing the hash value after the block address to generate a first to-be-verified value, and calculating a hash value of the first to-be-verified value to obtain the first verification value;

encrypting the first verification value by using the preset private key or the public key to obtain the digital signature, wherein the private key is a private key corresponding to the public key.

Furthermore, after the step of storing the digital signature, the block address, and the hash value in the verification table, and appending the verification table to the system file, the processor is further configured to perform a step of:

compiling the public key or the private key corresponding to the private key or the public key into the bootloader in an array form, so that the digital signature is decrypted by using the public key or the private key when starting the bootloader.

Second, the embodiment of the present invention provides a protection method of system partition key data, including:

obtaining a verification table corresponding to key data carried in a system partition file when a bootloader is started, wherein the verification table includes a digital signature, a block address, and a hash value;

decrypting the digital signature by using a preset public key or a private key to obtain a first verification value;

generating a second verification value according to the block address and the hash value, and comparing the first verification value with the second verification value; and starting a system if the first verification value is consistent with the second verification value.

In the protection method of system partition key data, the step of starting the system if the first verification value is consistent with the second verification value includes:

calculating a current hash value of the key data according to the block address if the first verification value is consistent with the second verification value;

comparing the current hash value with the hash value, and starting the system when the current hash value is consistent with the hash value.

In the protection method of system partition key data, before the step of obtaining the verification table corresponding to the key data carried in the system partition file when the bootloader is started, wherein the verification table includes the digital signature, the block address and the hash value, the protection method further includes:

generating a mapping file that records all files of system partition and corresponding block addresses when compiling a system file;

determining the block address corresponding to the key data according to the mapping file and calculating the hash value of the block address;

generating the first verification value according to the block address and the hash value, and encrypting the first verification value by using the preset private key or the public key to obtain the digital signature;

storing the digital signature, the block address, and the hash value in the verification table, and appending the verification table to the system file.

In the protection method of system partition key data, the step of generating the first verification value according to the block address and the hash value, and encrypting the first verification value by using the preset private key or the public key to obtain the digital signature includes:

placing the hash value after the block address to generate a first to-be-verified value, and calculating a hash value of the first to-be-verified value to obtain the first verification value;

encrypting the first verification value by using the preset private key or the public key to obtain the digital signature, wherein the private key is a private key corresponding to the public key.

In the protection method of system partition key data, after the step of storing the digital signature, the block address, and the hash value in the verification table, and appending the verification table to the system file, the protection method further includes:

compiling the public key or the private key corresponding to the private key or the public key into the bootloader in an array form, so that the digital signature is decrypted by using the public key or the private key when starting the bootloader.

Third, the embodiment of the present invention provides a protection system of system partition key data, including:
one or more processors;
a memory; and
one or more application programs, wherein the one or more application programs are stored in the memory and executed by the processor; and the one or more application programs includes:

an obtaining module, obtaining a verification table corresponding to key data carried in a system partition file when a bootloader is started, wherein the verification table includes a digital signature, a block address, and a hash value;

a decrypting module, decrypting the digital signature by using a preset public key or a private key to obtain a first verification value;

a comparing module, generating a second verification value according to the block address and the hash value, and comparing the first verification value with the second verification value; and an executing module, starting a system if the first verification value is consistent with the second verification value.

In the protection system of system partition key data, the executing module includes:

a calculating unit, calculating a current hash value of the key data according to the block address if the first verification value is consistent with the second verification value;

an executing unit, comparing the current hash value with the hash value, and starting the system when the current hash value is consistent with the hash value.

In the protection system of system partition key data, the one or more application programs further includes:

a generating module, generating a mapping file that records all files of system partition and corresponding block addresses when compiling a system file;

a calculating module, determining the block address corresponding to the key data according to the mapping file and calculating the hash value of the block address;

an encrypting module, generating the first verification value according to the block address and the hash value, and encrypting the first verification value by using the preset private key or the public key to obtain the digital signature;

a storing module, storing the digital signature, the block address, and the hash value in the verification table, and appending the verification table to the system file.

In the protection system of system partition key data, the encrypting module includes:

a generating unit, placing the hash value after the block address to generate a first to-be-verified value, and calculating a hash value of the first to-be-verified value to obtain the first verification value;

an encrypting unit, encrypting the first verification value by using the preset private key or the public key to obtain the digital signature, wherein the private key is a private key corresponding to the public key.

In the protection system of system partition key data, the one or more application programs further includes:

a compiling module, compiling the public key or the private key corresponding to the private key or the public key into the bootloader in an array form, so that the digital signature is decrypted by using the public key or the private key when starting the bootloader.

The benefits are: compared with the prior art, the present invention provides a protection method and a protection system of system partition key data and a terminal. The protection method includes: obtaining a verification table corresponding to key data carried in a system partition file when a bootloader is started, wherein the verification table includes a digital signature, a block address, and a hash value; decrypting the digital signature by using a preset public key or a private key to obtain a first verification value; generating a second verification value according to a block address and a hash value, and comparing the first verification value with the second verification value; and starting a system if the first verification value is consistent with the second verification value. The invention performs the verification of the key data instead performing the verification of the entire system file partition first, and then loading the system file; thus, the time of reading the entire system file partition for greatly reducing the system booting time and meanwhile, protecting the system.

DETAILED DESCRIPTION OF SPECIFIC EMBODIMENTS OF THE INVENTION

The present invention provides a protection method and a protection system of system partition key data and a terminal. For the purpose, technical solutions and advantages of the present invention will become clear, unambiguous, embodiments of the present invention is described in further detail below with reference to the accompanying drawings simultaneously. It should be understood that the specific embodiments described herein are merely for explaining the present invention and are not intended to limit the present invention.

In the present invention, the use of suffixes, such as "module", "component" or "unit" for indicating an element is merely an explanation for facilitating the present invention, and does not have a specific meaning per se. Thus, "module", "component" or "unit" can be used, alternately for one another.

The terminal device can be implemented in various forms. For example, the terminals described in the present invention may include, a mobile terminal, such as a mobile phone, a smart phone, a notebook computer, a digital broadcast receiver, a PDA (Personal Digital Assistant), a PAD (Tablet), a PMP (Portable Multimedia Player) and a navigation device and a fixed terminal, such as digital television and a desktop computer for illustration. However, those skilled in the art will appreciate that configurations in accordance with embodiments of the present invention can be applied to fixed type terminals in addition to components that are specifically for mobile purposes.

The content of the invention will be further described by the following description of embodiments with reference to the accompanying drawings.

Figure 1:
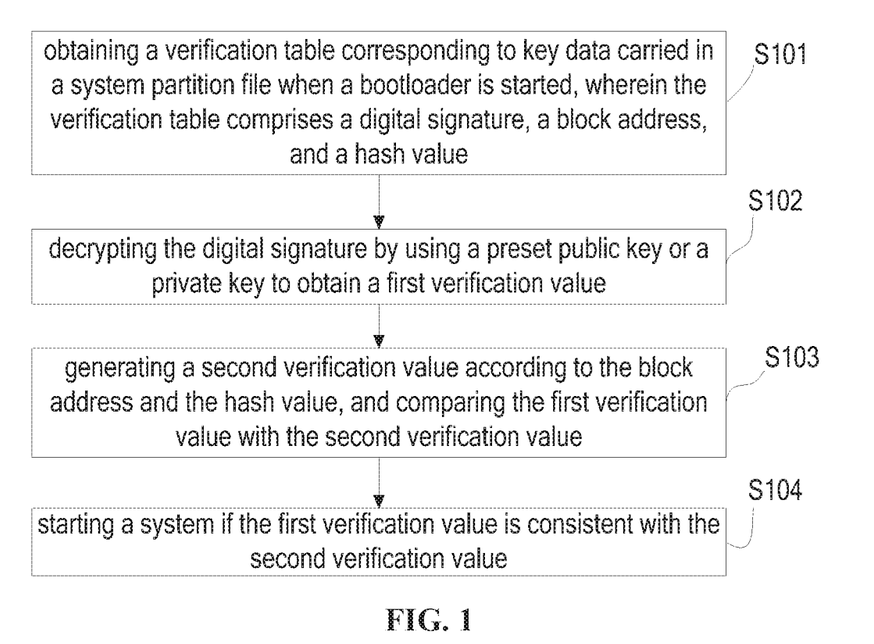
FIG. 1 is a flowchart of a protection method of system partition key data according to the preferred implementation of the present invention.

Please refer to FIG. 1. FIG. 1 is a flowchart of a protection method of system partition key data according to the preferred implementation of the present invention. The method includes:

Step S101, obtaining a verification table corresponding to key data carried in a system partition file when a bootloader is started, wherein the verification table includes a digital signature, a block address, and a hash value;

Step S102, decrypting the digital signature by using a preset public key or a private key to obtain a first verification value;

Step S103, generating a second verification value according to the block address and the hash value, and comparing the first verification value with the second verification value; and Step S104, starting a system if the first verification value is consistent with the second verification value.

In this embodiment, when the bootloader is started, the verification table of the key data carried in the system partition file is parsed to obtain a digital signature, a block address and a hash value; the digital signature is decrypted to obtain a first verification value, and a second verification value is generated according to the block address and the hash value; whether the key data is tampered with is determined by comparing the first verification value with the second verification value to determine whether to start the system. The invention performs the verification of the key data instead performing the verification of the entire system file partition first, and then loading the system file; thus, the time of reading the entire system file partition for greatly reducing the system booting time and meanwhile, protecting the system.

Specifically, in Step S101, the key data is preset as a part of the system partition file, for example, a file that records system properties. Namely, the key data is a system partition file.

In Step S102, the public key or the private key is carried in the bootloader startup program, and is used to decrypt the digital signature. The public key or private key corresponds to a private key or a public key that encrypts the first verification value during system compilation.

In Step S103, the block address and the Hash value are the block address and the hash value carried in the verification table in the system partition file according to the block address (Key Blocks) and the hash value (Key Hash). The step of generating the second verification value according to the block address and the hash value specifically includes: placing the hash value after the block address to form a second to-be-verified value (Key Blocks+Key Hash), and using an EVP series function provided in an openssl library to calculate a SHA256 hash value of address as the second verification value. In practical applications, when the content corresponding to the block address (Key Blocks) is too large, the content may be read in units of 4K, and each segment of content is inputted into the EVP function, and finally a SHA256 hash value is outputted. The SHA256 hash value obtained by the segment input is equivalent to directly calculating the SHA256 hash value for the entire content, so that the SHA256 hash value obtained by the segment input is recorded as the second verification value. Specifically, the method for generating the second verification value according to the block address and the hash value is the same as the method for generating the first verification value, so that whether the system partition key data file is tampered with can be determined according to the consistency of the first verification value and the second verification value, thereby determining the security of the system.

In Step S104, the first verification value is consistent with the second verification, and the key data file is considered to have not been tampered with, and the system can be started normally. Certainly, it is determined that a file of the key data is tampered with when the first verification value is inconsistent with the second verification value, and then automatically shutting down the system.

In one embodiment of the present invention, Step S104: starting the system if the first verification value is consistent with the second verification value includes:

Step S1041, calculating a current hash value of the key data according to the block address if the first verification value is consistent with the second verification value;

Step S1042, comparing the current hash value with the hash value, and starting the system when the current hash value is consistent with the hash value.

In this embodiment, when the first verification value and the second verification value are consistent, the hash value carried in the verification table is compared with the current hash value calculated according to the block address, thereby determining whether the storage address of the key data changes. The system is normally started when the storage address of the key data has not changed. Thus, the system is started normally when the key data has not been tampered with and the storage address has not changed, which further improves the security of the system.

Embodiment One

The embodiment provides a protection method of system partition key data, specifically including:

Step S201, generating a mapping file that records all files of system partition and corresponding block addresses when compiling a system file;

Step S202, determining the block address corresponding to the key data according to the mapping file and calculating the hash value of the block address;

Step S203, generating the first verification value according to the block address and the hash value, and encrypting the first verification value by using the preset private key or the public key to obtain the digital signature;

Step S204, storing the digital signature, the block address, and the hash value in the verification table, and appending the verification table to the system file;

Step S205, obtaining a verification table corresponding to key data carried in a system partition file when a bootloader is started;

Step S206, decrypting the digital signature by using a preset public key and a private key to obtain a first verification value;

Step S207, generating a second verification value according to the block address and the hash value, and comparing the first verification value with the second verification value; and Step S208, starting a system if the first verification value is consistent with the second verification value.

In the protection method of system partition key data provided by the present embodiment, first, when a system partition file is compiled, a mapping file, in which all files of the system partition and corresponding block addresses are recorded, is generated, and according to the mapping file, the block address corresponding to the key data is determined, and the first verification value is generated according to the block address, and the digital signature is generated by using the public key or the private key. The digital signature, the block address and the hash value carried in the system partition file when the bootloader is started, and the digital signature is decrypted by using the preset public key or the private key to obtain the first verification value. Meanwhile, the second verification value is generated according to the block address and the hash value. Whether the key data file is tampered with can be determined according to the first verification value and the second verification value, thereby determining the security of the system.

Specifically, in Step S201, when compiling the system file, the mapping file that records all files of system partition and corresponding block addresses is generated. The name of the system partition file and the corresponding block address are recorded in the mapping file. Namely, the mapping file records the name of the system partition file, the block address and the correspondence between the name of the system partition file and the block address. In the mapping file, the corresponding block address can be determined according to the name of the system partition file, and the corresponding name of the system partition file can also be determined according to the block address. Thus, the block address corresponding to the key data file can be parsed from the mapping file. In the practical application, the content selection of the mapping file may be:

/system/xbin/tcpdump 293974-294294
/system/xbin/taskstats 293969-293972
/system/xbin/su 293965-293967
/system/xbin/strace 293801-293963
/system/xbin/sqlite3 293781-293799
/system/xbin/simpleperf 293680-293779.

In Step S202, the block address (Key Blocks) is usually a range of addresses recorded in the xxx-xxx format. Calculating the hash value of the block address may use the EVP series function provided in the openssl library to calculate the SHA256 hash value of the address. If the content corresponding to the address is too large, the content may be read in units of 4K in segment to be inputted into the EVP function, and finally a SHA256 hash value is outputted. The final result is equivalent to directly calculating the SHA256 hash value for the entire content. The pseudo code for calculating the SHA256 hash value using the EVP may be:

```
int main(int argc, char **argv)
{
size_t block_size = 4096;// 4K
size_t out_size = 0;
size_t offset_block = 0;
size_t blocks = 0;
//input string for calculate SHA256 hash
const unsigned char *data = "this is the test string for calculate SHA256";
//get EVP_MD structures for the sha256 digest algorithms respectively
const EVP_MD *md = EVP_sha256( );
if (!md) {
FATAL("failed to get digest\n");
}
//get the SHA256 hash size
size_t hash_size = EVP_MD_size(md);
unsigned char out_hash[hash_size];
//calculate SHA256 hash
hash_file(md,
      data, sizeof(data),
      out_hash, &out_size,
block_size);
//print the SHA256 hash
for (size_t i = 0; i < hash_size; i++) {
printf("%02x", out_hash[i]);
}
}
int hash_file(const EVP_MD *md,
const unsigned char *in, size_t in_size,
unsigned char *out, size_t *out_size,
size_t block_size)
{
*out_size = 0;
EVP_MD_CTX *mdctx;
unsigned int s;
int ret = 1;
//initializes a digest context
mdctx = EVP_MD_CTX_create( );
assert(mdctx);
//sets up digest context mdctx to use SHA256
ret &= EVP_DigestInit_ex(mdctx, md, NULL);
for (size_t i = 0; i < in_size; i += block_size) {
/*calculate SHA256 hash,This function can be
*called several times on the same mdctx to hash additional data
*/
ret &= EVP_DigestUpdate(mdctx, in + i, block_size);
}
//get the SHA256 hash value from mdctx
ret &= EVP_DigestFinal_ex(mdctx, out, &s);
//cleans up
EVP_MD_CTX_destroy(mdctx);
assert(ret == 1);
if (out_size) {
*out_size = s;
}
return 0;
}.
```

In Step S203, generating the first verification value according to the block address and the hash value may determine the first verification value by using the RSA2048 algorithm, and the first verification value is encrypted by using a private key or a public key pre-generated to obtain the digital signature (Signature). The calculation method of the digital signature (Signature) adopts a standard RSA signature process, which is specifically: obtaining the content to be signed [Key Blocks+Key Hash], and then using the RSA2048 algorithm to sign the aforesaid content to obtain the digital signature (Signature). Specifically, the private or the public key used for the encryption is paired with the public key or the private key used for subsequent decryption.

Illustratively, generating the first verification value according to the block address and the hash value, and encrypting the first verification value by using the preset private key or the public key to obtain the digital signature specifically can includes:

Step S2031, placing the hash value after the block address to generate a first to-be-verified value, and calculating a hash value of the first to-be-verified value to obtain the first verification value;

Step S2032, encrypting the first verification value by using the preset private key or the public key to obtain the digital signature.

In another embodiment of the present invention, in order to facilitate obtaining the public key or the private key corresponding to the private key or the public key when the bootloader is started, Step S204 may further include: compiling the public key or the private key corresponding to the private key or the public key into the bootloader in an array form, so that the digital signature is decrypted by using the public key or the private key when starting the bootloader.

Figure 2:
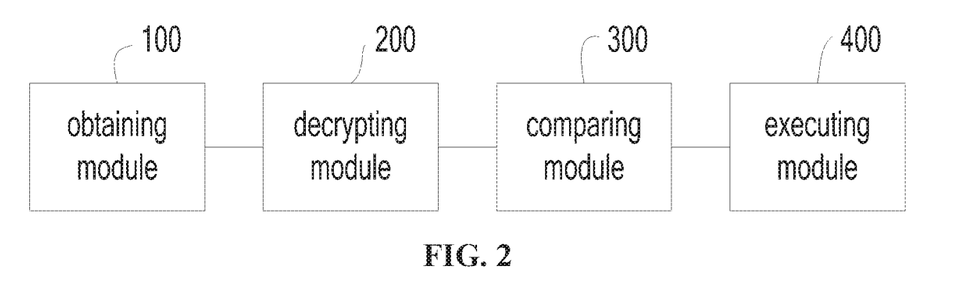
FIG. 2 is a structural diagram of a protection system of system partition key data according to the present invention.

The present invention further provides a protection system of system partition key data, as shown in FIG. 2, including:

an obtaining module 100, obtaining a verification table corresponding to key data carried in a system partition file when a bootloader is started, wherein the verification table includes a digital signature, a block address, and a hash value;

a decrypting module 200, decrypting the digital signature by using a preset public key or a private key to obtain a first verification value;

a comparing module 300, generating a second verification value according to the block address and the hash value, and comparing the first verification value with the second verification value; and an executing module 400, starting a system if the first verification value is consistent with the second verification value.

In the protection system of system partition key data, the executing module includes:

a calculating unit, calculating a current hash value of the key data according to the block address if the first verification value is consistent with the second verification value;

an executing unit, comparing the current hash value with the hash value, and starting the system when the current hash value is consistent with the hash value.

The protection system of system partition key data further includes:

a generating module, generating a mapping file that records all files of system partition and corresponding block addresses when compiling a system file;

a calculating module, determining the block address corresponding to the key data according to the mapping file and calculating the hash value of the block address;

an encrypting module, generating the first verification value according to the block address and the hash value, and encrypting the first verification value by using the preset private key or the public key to obtain the digital signature;

a storing module, storing the digital signature, the block address, and the hash value in the verification table, and appending the verification table to the system file.

In the protection system of system partition key data, the encrypting module includes:

a generating unit, placing the hash value after the block address to generate a first to-be-verified value, and calculating a hash value of the first to-be-verified value to obtain the first verification value;

an encrypting unit, encrypting the first verification value by using the preset private key or the public key to obtain the digital signature, wherein the private key is a private key corresponding to the public key.

The protection system of system partition key data further includes:

a compiling module, compiling the public key or the private key corresponding to the private key or the public key into the bootloader in an array form, so that the digital signature is decrypted by using the public key or the private key when starting the bootloader.

The foregoing various modules of the protection system of the system partition key data have been described in detail in the aforesaid method, and will not be repeatedly described herein.

Besides, in several embodiments provided by the present invention, it should be understood that the disclosed system and method may be implemented in other ways. As an illustration, the embodiment of the device described above is merely illustrative. For example, the division of the module is only a logical function division and there are additional ways of actual implement, such as, multiple units or components may be combined or can be integrated into another system. Or, some feature can be ignored or not executed. In addition, the coupling, the direct coupling or the communication connection shown or discussed may be either an indirect coupling or a communication connection through some interfaces, devices or units, or may be electrically, mechanically or otherwise connected.

The units described as the separation means may or may not be physically separated. The components shown as units may or may not be physical units, i.e., may be located in one place or may be distributed over a plurality of network units. The part or all of the units can be selected according to the actual demands to achieve the object of the present embodiment.

The respective function units in the respective embodiments of the present invention can be integrated in one process unit, or the individual units are physically presented, or two or more units are integrated in one unit. The foregoing integrated units can be implemented in the form of hardware or in the form of a hardware and a software functional unit.

The aforesaid integrated unit implemented in the form of a software functional unit can be stored in a computer readable storage medium. The software functional unit described above is stored in a storage medium and includes instructions for causing a computer device (which may be a personal computer, a server, or a network device, etc.) or a processor to perform some steps of the methods of the various embodiments of the present invention. The foregoing storage medium includes: a U disk, a mobile hard disk, a read-only memory (ROM), a random access memory (RAM), a magnetic disk, or an optical disk, which can store program codes.

Figure 3:
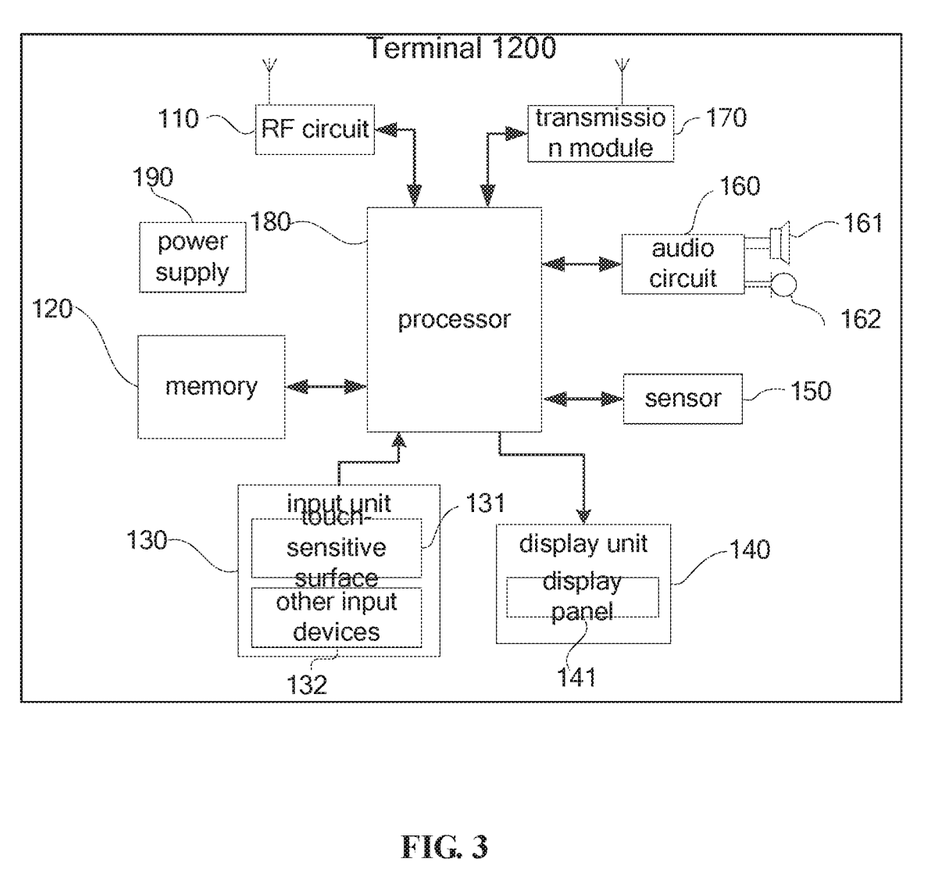
FIG. 3 is a structural diagram of a terminal according to the embodiment of the present invention.

FIG. 3 shows a structural diagram of a terminal according to the embodiment of the present invention. The terminal can be used to implement the protection method and the protection system of system partition key data provided in the foregoing embodiments. The terminal 1200 can be a smart phone or a tablet.

As shown in FIG. 3, the terminal 1200 may include an RF (Radio Frequency) circuit 110, a memory 120 including one or more (only one shown) computer-readable storage medium, an input unit 130, a display unit 140, a sensor 150, an audio circuit 160, a transmission module 170, a processor 180 including one or more processing core (only one shown in the figure) and a power supply 190. It will be understood by those skilled in the art that the structure of the terminal 1200 shown in FIG. 3 does not constitute a limitation of the terminal 1200, and may include more or less components than those illustrated, or a combination of certain components, or different component arrangements.

The RF circuit 110 is configured to receive and transmit electromagnetic waves, and to realize mutual conversion between electromagnetic waves and electrical signals, thereby communicating with a communication network or other devices. The RF circuit 110 may include various existing circuit elements for performing these functions, such as an antenna, a radio frequency transceiver, a digital signal processor, an encryption/decryption chip, a Subscriber Identity Module (SIM) card and a memory. The RF circuit 110 can communicate with various networks such as the Internet, an intranet, a wireless network, or communicate with other devices over a wireless network. The wireless network described above may include a cellular telephone network, a wireless local area network or a metropolitan area network. The aforesaid wireless network can use various communication standards, protocols and technologies, including but not limited to Global System for Mobile Communication (GSM), Enhanced Data GSM Environment (EDGE), and wideband code. Wideband Code Division Multiple Access (WCDMA), Code Division Access (CDMA), Time Division Multiple Access (TDMA), Wireless Fidelity (Wi-Fi) (such as the Institute of Electrical and Electronics Engineers Standard IEEE 802.11a, IEEE 802.11b, IEEE 802.11g and/or IEEE 802.11n), Voice over Internet Protocol (VoIP), Worldwide Interoperability for Microwave Access, Wi-Max), other protocols for mail, instant messaging, and short messages, as well as any other suitable communication protocol, may even include protocols that are not currently being developed.

The memory 120 can be used to store software programs and modules, such as program instructions and modules corresponding to the protection method and the protection system of system partition key data in the foregoing embodiment. The processor 180 executes each of the software programs and modules stored in the memory 120, thereby performing various functional applications and data processing, that is, achieving the function of protecting the system partition key data. The memory 120 can include high speed random access memory, and can also include non-volatile memory, such as one or more magnetic storage devices, flash memory or other non-volatile solid state memory. In some embodiments, memory 120 can further include a memory remotely located relative to the processor 180, which can be connected to terminal 1200 via a network. The embodiments of aforesaid networks include, but are not limited to, the Internet, an intranet, a local area network, a mobile communication network and combinations thereof.

The input unit 130 can be configured to receive input numeric or character information and to generate keyboard, mouse, joystick, optical or trackball signal inputs related to user settings and function controls. In particular, the input unit 130 can include a touch-sensitive surface 131 as well as other input devices 132. The touch-sensitive surface 131, also referred to as a touch display or trackpad, can collect touch operations on or near the user (e.g., the user uses a finger, stylus, etc., any suitable object or accessory on the touch-sensitive surface 131 or the operation near the touch-sensitive surface 131) and can drive the corresponding connected device according to a preset program. Optionally, the touch-sensitive surface 131 can include two portions of a touch detection device and a touch controller. The touch detection device detects a touch orientation of the user, and detects a signal caused by the touch operation, and then transmits a signal to the touch controller; the touch controller receives the touch information from the touch detection device, and converts the touch information into contact coordinates, and then sends the same to the processor 180, and can receive commands from the processor 180 and execute the same. In addition, the touch-sensitive surface 131 can be implemented in various types such as resistive, capacitive, infrared and surface acoustic waves. In addition to the touch-sensitive surface 131, the input unit 130 can also include other input devices 132. Specifically, the other input devices 132 may include, but are not limited to, one or more of a physical keyboard, function keys (such as volume control buttons, switch buttons, etc.), trackballs, mice and joysticks.

The display unit 140 can be used to display information entered by the user or the information provided for the user and various graphical user interfaces of terminal 1200, which can be constructed from graphics, text, icons, video and any combination thereof. The display unit 140 may include a display panel 141. Optionally, the display panel 141 may be configured in a form of an LCD (Liquid Crystal Display) or an OLED (Organic Light-Emitting Diode). Furthermore, the touch-sensitive surface 131 may cover the display panel 141. When the touch-sensitive surface 131 detects a touch operation thereon or nearby, the operation is transmitted to the processor 180 to determine the type of the touch event, and then the processor 180 provides a corresponding visual output on the display panel 141 depending on the type of touch event. Although in FIG. 3, touch-sensitive surface 131 and display panel 141 are implemented as two separate components for achieving input function and input function. In some embodiments, the touch-sensitive surface 131 can be integrated with the display panel 141 for achieving input function and input function.

The terminal 1200 can also include at least one type of sensor 150, such as a light sensor, motion sensor and other sensors. Specifically, the light sensor may include an ambient light sensor and a proximity sensor, wherein the ambient light sensor may adjust the brightness of the display panel 141 according to the brightness of the ambient light, and the proximity sensor may power off the display panel 141 and/or the backlight when the terminal 1200 is moved to the ear. As one motion sensor, the gravity acceleration sensor can detect the magnitude of acceleration in various directions (usually three axes). When it is stationary, it can detect the magnitude and direction of gravity. It can be used to identify the gesture of the mobile phone (such as horizontal and vertical screen switching, related game, magnetometer attitude calibration), vibration recognition related functions (such as pedometer and tapping) and etc.; the terminal 1200 can also be configured with gyroscopes, barometers, hygrometers, thermometers, infrared sensors and other sensors, and details are not described here.

The audio circuit 160, the speaker 161 and the microphone 162 can provide an audio interface between the user and the terminal 1200. The audio circuit 160 can transmit the converted electrical signal of the audio data to the speaker 161, and the speaker 161 converts the electrical signal into a sound signal for outputting; on the other hand, the microphone 162 converts the collected sound signal into an electrical signal, which is received by the audio circuit 160 and is converted into audio data, and then the audio data is outputted to the processor 180 for processing, and then, is transmitted to another terminal for illustration through the RF circuit 110. Alternatively, the audio data is outputted to the memory 120 for further processing. The audio circuit 160 may also include an ear plug jack to provide communication of the peripheral earphones with the terminal 1200.

The terminal 1200 can help the user to send and receive emails, browse web pages, access streaming media, etc. through the transmission module 170 (such as a Wi-Fi module), which provides wireless broadband internet access to the user. Although FIG. 3 shows the transmission module 170, it can be understood that it does not belong to the essential configuration of the terminal 1200, and may be omitted as needed within the scope of not changing the essence of the invention.

The processor 180 is a control center of the terminal 1200 that connects various portions of the entire mobile phone with various interfaces and wires. By running or executing software programs and/or modules stored in the memory 120, and invoking the data stored in the memory 120, the various functions of the terminal 1200 is performed and the data is processed to perform overall monitoring of the mobile phone. Optionally, the processor 180 may include one or more processing cores; in some embodiments, the processor 180 can integrate an application processor and a modem processor, wherein the application processor primarily processes an operating system, a user interface, an application, etc., and the modem processor primarily processes the wireless communications. It can be understood that the aforesaid modem processor may not be integrated into the processor 180.

The terminal 1200 also includes the power supply 190 (such as a battery) that supplies powers for the various components. In some embodiments, the power supply can be logically coupled to the processor 180 through a power management system to manage charging, discharging and power consumption management through the power management system. The power supply 190 may also include an arbitrary combination of any one or more of a DC or AC power source, a recharging system, a power failure detection circuit, a power converter or inverter and a power status indicator.

Although not shown, the terminal 1200 may further include a camera (such as a front camera, a rear camera) and a Bluetooth module, and details are not described here. Specifically, in this embodiment, the display unit of the terminal is a touch screen display. The terminal further includes a memory, and one or more programs, wherein the one or more programs are stored in the memory and configured to be executed by one or more processors, the one or more programs include instructions for executing the following operations:

obtaining a verification table corresponding to key data carried in a system partition file when a bootloader is started, wherein the verification table includes a digital signature, a block address, and a hash value;

decrypting the digital signature by using a preset public key or a private key to obtain a first verification value;

generating a second verification value according to the block address and the hash value, and comparing the first verification value with the second verification value; wherein generating the second verification value specifically includes: placing the hash value after the block address to form a second to-be-verified value, and using an EVP series function provided in an openssl library to calculate a SHA256 hash value of address as the second verification value;

starting a system if the first verification value is consistent with the second verification value; and determining that a file of the key data is tampered with when the first verification value is inconsistent with the second verification value, and automatically shutting down the terminal.

Furthermore, the step of starting the system if the first verification value is consistent with the second verification value includes:

calculating a current hash value of the key data according to the block address if the first verification value is consistent with the second verification value;

comparing the current hash value with the hash value, and starting the system when the current hash value is consistent with the hash value.

Furthermore, before the step of obtaining the verification table corresponding to the key data carried in the system partition file when the bootloader is started, wherein the verification table comprises the digital signature, the block address and the hash value, the processor is configured to perform steps of:

generating a mapping file that records all files of system partition and corresponding block addresses when compiling a system file;

determining the block address corresponding to the key data according to the mapping file and calculating the hash value of the block address;

generating the first verification value according to the block address and the hash value, and encrypting the first verification value by using the preset private key or the public key to obtain the digital signature;

storing the digital signature, the block address, and the hash value in the verification table, and appending the verification table to the system file.

Furthermore, the step of generating the first verification value according to the block address and the hash value, and encrypting the first verification value by using the preset private key or the public key to obtain the digital signature includes:

placing the hash value after the block address to generate a first to-be-verified value, and calculating a hash value of the first to-be-verified value to obtain the first verification value;

encrypting the first verification value by using the preset private key or the public key to obtain the digital signature, wherein the private key is a private key corresponding to the public key.

Furthermore, after the step of storing the digital signature, the block address, and the hash value in the verification table, and appending the verification table to the system file, the processor is configured to perform steps of:

compiling the public key or the private key corresponding to the private key or the public key into the bootloader in an array form, so that the digital signature is decrypted by using the public key or the private key when starting the bootloader.

It should be noted that the above embodiments are only used to illustrate the technical solutions of the present invention, and are not limited thereto; although the present invention has been described in detail with reference to the foregoing embodiments, those skilled in the art should understand that the technical solutions described in the foregoing embodiments may be modified, or some of the technical features may be equivalently replaced; and the modifications or replacements do not deviate from the spirit and scope of the technical solutions of the embodiments of the present invention.

What is claimed is:

1. A terminal, the terminal comprising a processor, a system, and a memory, wherein the memory includes a system partition, a system file, a system partition file, and a bootloader; the memory is configured to store instructions and data, and the processor is configured to perform following steps:
    generating a mapping file that records files of the system partition and corresponding block addresses when compiling the system file;
    determining, according to the mapping file, a block address corresponding to key data in the system partition file when the bootloader is started, and calculating a hash value of the block address;
    generating a first verification value according to the block address and the hash value, and encrypting the first verification value using a preset private key or a public key to obtain a digital signature;
    storing the digital signature, the block address, and the hash value in a verification table, and appending the verification table to the system file;
    obtaining the verification table corresponding to the key data, wherein the verification table comprises the digital signature, the block address, and the hash value;
    decrypting the digital signature using the preset public key or the private key to obtain the first verification value;
    generating a second verification value according to the block address and the hash value, and comparing the first verification value with the second verification value; wherein generating the second verification value specifically comprises: placing the hash value after the block address to form a second to-be-verified value, and using an EVP series function provided in an openssl library to calculate a SHA256 hash value of address as the second verification value;
    starting the system if the first verification value is same as the second verification value; and
    determining that a file of the key data is tampered with when the first verification value is not same as the second verification value, and automatically shutting down the terminal.

2. The terminal according to claim 1, wherein the step of starting the system if the first verification value is same as the second verification value comprises:
    calculating a current hash value of the key data according to the block address if the first verification value is same as the second verification value;
    comparing the current hash value with the hash value, and starting the system when the current hash value is same as the hash value.

3. The terminal according to claim 1, wherein the step of generating the first verification value according to the block address and the hash value and encrypting the first verification value using the preset private key or the public key to obtain the digital signature comprises:
    placing the hash value after the block address to generate a first to-be-verified value, and calculating a hash value of the first to-be-verified value to obtain the first verification value; and
    encrypting the first verification value using the preset private key or the public key to obtain the digital signature, wherein the private key is a private key corresponding to the public key.

4. The terminal according to claim 1, wherein after the step of storing the digital signature, the block address, and the hash value in the verification table, and appending the verification table to the system file; the processor is further configured to perform a step of:
    compiling the public key or the private key corresponding to the private key or the public key into the bootloader in an array form, so that the digital signature is decrypted using the public key or the private key when starting the bootloader.

5. A protection method of system partition key data for determining whether to start a system of a terminal, the terminal comprising a memory that includes a system partition, a system file, a system partition file, and a bootloader; the protection method comprising:
    generating a mapping file that records files of system partition and corresponding block addresses when compiling the system file;
    determining, according to the mapping file, a block address corresponding to key data carried in the system partition file when the bootloader is started, and calculating a hash value of the block address;
    generating a first verification value according to the block address and the hash value, and encrypting the first verification value using a preset private key or a public key to obtain a digital signature;
    storing the digital signature, the block address, and the hash value in a verification table, and appending the verification table to the system file;
    obtaining the verification table corresponding to the key data, wherein the verification table comprises the digital signature, the block address, and the hash value;
    decrypting the digital signature using the preset public key or the private key to obtain the first verification value;
    generating a second verification value according to the block address and the hash value, and comparing the first verification value with the second verification value; and
    starting the system if the first verification value is same as the second verification value.

6. The protection method of system partition key data according claim 5, wherein the step of starting the system if the first verification value is same as the second verification value comprises:
    calculating a current hash value of the key data according to the block address if the first verification value is same as the second verification value; and
    comparing the current hash value with the hash value, and starting the system when the current hash value is same as the hash value.

7. The protection method of system partition key data according to claim 5, wherein the step of generating the first verification value according to the block address and the hash value, and encrypting the first verification value using the preset private key or the public key to obtain the digital signature comprises:

placing the hash value after the block address to generate a first to-be-verified value, and calculating a hash value of the first to-be-verified value to obtain the first verification value; and     encrypting the first verification value using the preset private key or the public key to obtain the digital signature, wherein the private key is a private key corresponding to the public key.

8. The protection method of system partition key data according to claim 5, wherein after the step of storing the digital signature, the block address, and the hash value in the verification table; and appending the verification table to the system file, the protection method further comprises:

compiling the public key or the private key corresponding to the private key or the public key into the bootloader in an array form, so that the digital signature is decrypted using the public key or the private key when starting the bootloader.

9. A protection system of system partition key data for determining whether to start a system of a terminal; the protection system comprising:

one or more processors;

a memory including a system partition, a system file, a system partition file, and a bootloader; and     one or more application programs, wherein the one or more application programs are stored in the memory and executed by the processor to perform a method comprising:

generating a mapping file that records files of system partition and corresponding block addresses when compiling the system file;

determining, according to the mapping file, a block address corresponding to key data carried in the system partition file when the bootloader is started, and calculating a hash value of the block address;

generating a first verification value according to the block address and the hash value, and encrypting the first verification value using a preset private key or a public key to obtain a digital signature;

storing the digital signature, the block address, and the hash value in a verification table, and appending the verification table to the system file;

obtaining the verification table corresponding to the key data, wherein the verification table comprises the digital signature, the block address, and the hash value;

decrypting the digital signature using the preset public key or the private key to obtain the first verification value;

generating a second verification value according to the block address and the hash value, and comparing the first verification value with the second verification value; and     starting the system if the first verification value is same as the second verification value.

10. The protection system of system partition key data according to claim 9, wherein the step of starting the system if the first verification value is consistent with the second verification value comprises:

calculating a current hash value of the key data according to the block address if the first verification value is same as the second verification value; and     comparing the current hash value with the hash value, and starting the system when the current hash value is same as the hash value.

11. The protection system of system partition key data according to claim 9, wherein the step of encrypting the first verification value using the preset private key or the public key to obtain the digital signature comprises:

placing the hash value after the block address to generate a first to-be-verified value, and calculating a hash value of the first to-be-verified value to obtain the first verification value; and     encrypting the first verification value using the preset private key or the public key to obtain the digital signature, wherein the private key is corresponding to the public key.

12. The protection system of system partition key data according to claim 9, wherein the method further comprises:

compiling the public key or the private key corresponding to the private key or the public key into the bootloader in an array form, so that the digital signature is decrypted using the public key or the private key when starting the bootloader.

\* \* \* \* \*